United States Patent [19]

Biskup

[11] Patent Number: 4,637,160
[45] Date of Patent: Jan. 20, 1987

[54] FISH SKIN LURE

[76] Inventor: Andrew L. Biskup, 6N480 Fairway La., Itasca, Ill. 60143

[21] Appl. No.: 868,005

[22] Filed: May 29, 1986

[51] Int. Cl.⁴ .................................................. A01K 85/04
[52] U.S. Cl. ..................................... 43/42.33; 43/42.5
[58] Field of Search ..................... 43/42.33, 42.32, 42.5

[56] References Cited

U.S. PATENT DOCUMENTS

| | | | |
|---|---|---|---|
| 1,326,821 | 12/1919 | Ackerman | 43/42.5 |
| 1,599,747 | 9/1926 | Dills | 43/42.5 |
| 2,632,276 | 3/1953 | Hale | 43/42.06 |
| 2,796,693 | 6/1957 | Gunterman | 43/42.5 |
| 2,996,826 | 8/1961 | Lamar | 43/42.5 |
| 4,047,317 | 9/1977 | Pfister | 43/42.06 |
| 4,180,936 | 1/1980 | Davis | 43/42.5 |

Primary Examiner—Gene P. Crosby
Attorney, Agent, or Firm—Edward J. Biskup

[57] ABSTRACT

A lure for fishing that simulates a live fish by incorporating therein and exposing the scale side of a fish skin of a recently caught fish while simultaneously firmly retaining the peripheral edges of the fish skin so that water flows along the length of the exposed skin to provide a visual and scented attraction to a live fish.

18 Claims, 6 Drawing Figures

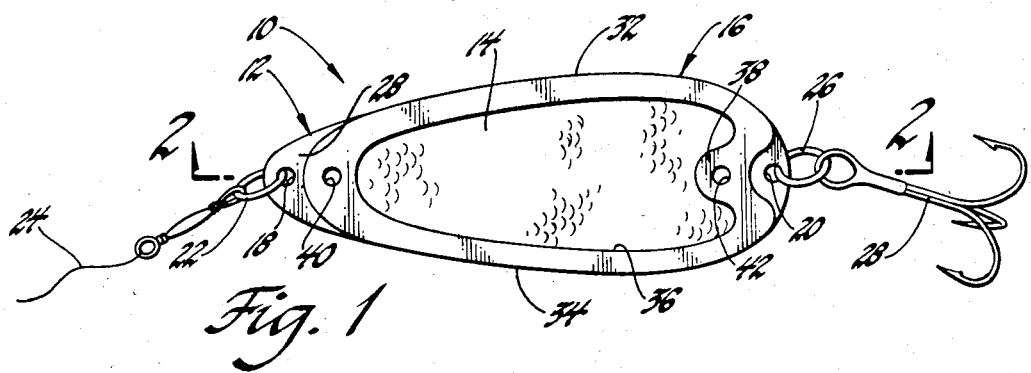
Fig. 1
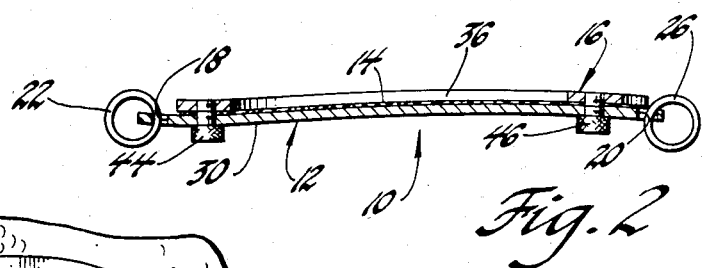
Fig. 2
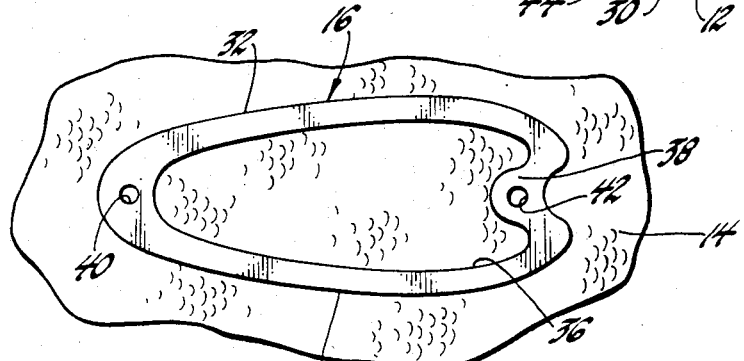
Fig. 3
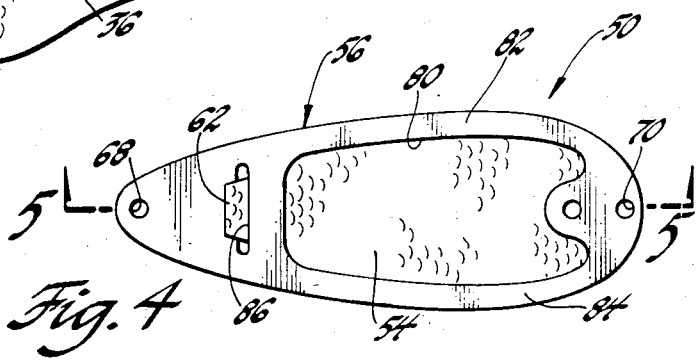
Fig. 4
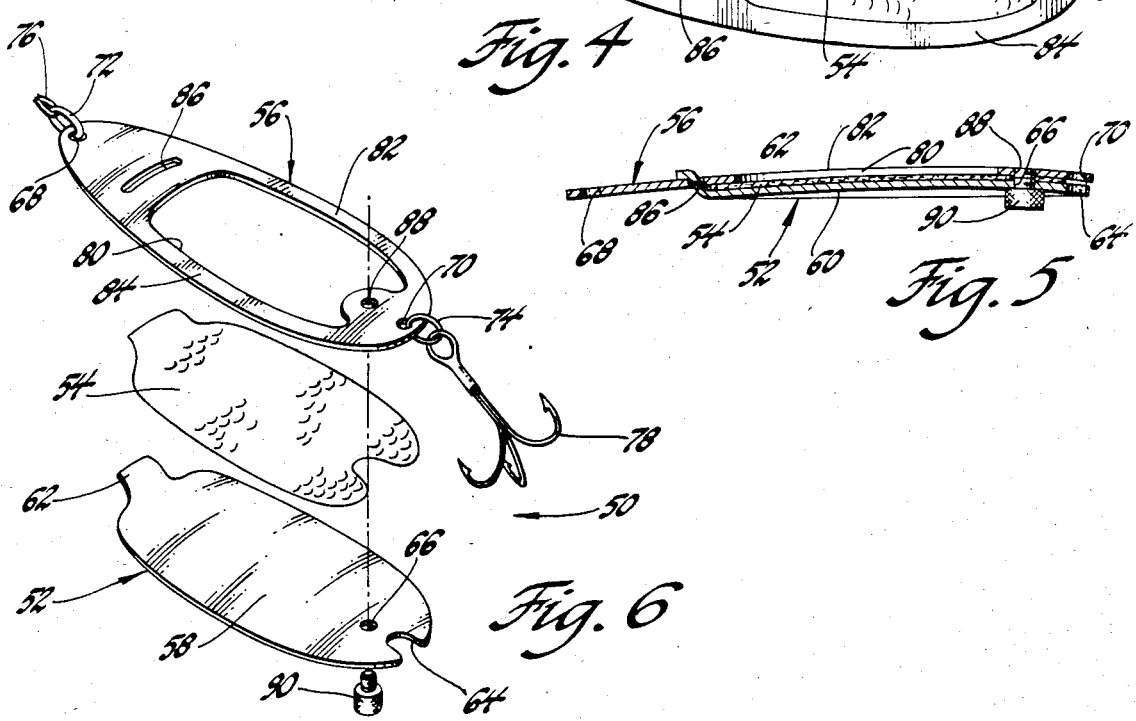
Fig. 5
Fig. 6

FISH SKIN LURE

This invention concerns fishing lures in general and more particularly a lure having a scented material secured thereto for attracting fish.

Fishing lures designed to carry parts of a previously live fish or other form of scented bait for providing a realistic odor that appeals to the senses of game fish are not new. Examples of such lures can be seen in U.S. Pat. No.1,913,362 and 2,004,308 to Cataran, U.S. Pat. No.2,632,276, U.S. Pat. No. 3,457,666 to Klinkhamer and U.S. Pat. No. 4,047,317 to Hale. The prior lures such as seen in Catarau, Hale, and Pfister have been formed with an essentially closed compartment having a plurality of relatively small openings for allowing water to flow through the compartment while the lure is being pulled through the water to thereby disperse minute particles therefrom. One drawback of this type of lure is that the angler must rely strictly on the scent of the minute particles to attract the fish. Since the art of catching fish also requires the bait to visually appeal to the fish in order to entice them to strike the lure, the lures in the aforementioned patents have been deficient in this respect. Even where the bait is intended to be exposed for providing visual attraction to the fish in the manner of Klinkhamer, this is not entirely satisfactory because in most cases the bait is attached to the lure so that a major part of the bait is suspended from the lure and readily can be torn free by the fish without providing a "catch."

The present invention solves the above described problems with prior scented lures by providing a lure which not only emits a scent for attracting fish but also allows the fish to view a major part of a captive bait which cannot be readily detached from the lure. This is accomplished by providing a lure that allows the usually discarded fish skin from a recently caught and filleted fish to be firmly attached to a spoon so that a major part of the scales of the fish skin are exposed to simulate a live fish and permit the lure to look, act, and have the scent of a live fish.

More specifically and in the preferred form, the lure according to the present invention comprises a base spoon having the opposite ends thereof provided with a pair of rings one of which is adapted to be connected to the line of an angler's tackle while the other is adapted to support a hook. A fish skin from a recently caught fish covers one surface of the base spoon, and a holder is provided having a configuration generally conforming to the configuration of the base spoon. The holder is intended to contact the fish skin adjacent the periphery of the base spoon, and has an opening formed therein approximately the length and width of the base spoon so as to expose a major portion of the scales of the fish skin. In addition, readily removable fastening means are provided for rigidly connecting the holder to the base spoon so as to compress the edges of the fish skin therebetween and maintain the fish skin on the base spoon while the lure is in the water.

The objects of the present invention are to provide a new and improved lure that consists of a dished base member and a holder member the latter of which is capable of firmly securing to the base member a skin of a fish in a manner so as to expose a substantial portion of the scales on the fish skin; to provide a new and improved fish lure that includes a base spoon member the convex side of which serves to support the skin of a fish and is adapted to have mounted thereon and fastened thereto the concave side of a peripheral holder member for maintaining the fish skin onto the base spoon while exposing a large part of the fish skin; and to provide a new and improved lure for fishing that simulates a live fish by incorporating therein and exposing the scale side of a recently caught fish while simultaneously firmly retaining the peripheral edges of the fish skin so that water flows along the entire length of the exposed skin to provide a visual and scented attraction to a fish that will appeal to its diet.

The above objects and others will be apparent from the following detailed description when taken with the accompanying drawing in which:

FIG. 1 is a plan view of a lure made in accordance with the present invention;

FIG. 2 is a longitudinal sectional view taken on line 2—2 of FIG. 1 showing the major parts of the lure comprising a base member, a fish skin, and a holder member;

FIG. 3 is a plan view showing the holder member being used as a template located on top of the skin of a fish;

FIG. 4 is a modified form of the lure shown in FIG. 1;

FIG. 5 is a longitudinal sectional view of the lure of FIG. 4 taken on line 4—4 thereof; and FIG. 6 is an exploded view showing the various parts of the modified lure of FIGS. 4 and 5.

Referring now to the drawings and more particularly FIGS. 1 and 2 thereof, a fish lure 10 is shown that generally consists of a base spoon member 12, a fish skin 14, and a holder member 16. As is conventional, the opposite ends of the base spoon member 12 are respectively provided with round holes 18 and 20, the former of which is provided with a ring 22 connected to a fish line 24 and the latter of which is provided with a ring 26 which supports a hook 28 either of the triple or double type.

More specifically, the base spoon member 12 is made from a metallic material such as brass or bronze and, although not necessary, can be either nickel or chrome plated so as to present a reflecting surface to the viewer. As is conventional, the base spoon member 12 is oblong in plan view and takes the form of a dished blade so when viewed in longitudinal cross section as seen in FIG. 2, and also in transverse cross section, the base spoon member 12 has a somewhat curved configuration. Thus, it should be apparent that the base spoon member 12 has a generally convex surface 28 on its top side as seen in FIG. 1, and a generally concave surface 30 on its bottom side as seen in FIG. 2.

The holder member 16 as seen in FIG. 1 is also made of a metallic material and is oblong in plan view and designed to be complementary in longitudinal and transverse cross section to the convex surface 28 of the base spoon member 12. Thus, as seen in FIGS. 1 and 2, although the holder member 16 is slightly shorter in longitudinal length than the base spoon member 12, the laterally spaced side edges 32 and 34 are configured so as to register and conform in shape with the corresponding side edges of the base spoon member 12. In addition, an oblong opening 36 is formed in the holder member 16 so as to provide, in effect, a tear drop shaped ring with an inwardly projecting section 38 at the end adjacent the hole 20. The holder member 16 is also formed with bores 40 and 42 which are tapped so as to respectively threadably receive a pair of screws 44 and 46 each of which has a knurled head for allowing finger operation thereof. The screws 44 and 46 are adapted to pass through a pair of holes formed in the base spoon member 12 that register with the bores 40 and 42 so that upon rotation of the screws 44 and 46, the member 16 is firmly secured to the base spoon member 12.

Prior to fastening the holder member 16 to the base spoon member 12 as described above, the skin 14 of a fish is interposed between the holder member 16 and the base spoon member 12. In this regard, the fish skin would be obtained from a fish previously caught or one which may have been purchased for this purpose. It will be noted that as seen in FIG. 3, the fish skin 14 to be incorporated in the lure 10 is initially placed on a flat board or the like, and the holder member 16 is positioned thereon with its concave surface contacting the fish skin. Afterwards, a single edge blade or a sharp knife is used for cutting the fish skin along the entire edge of the holder member 16. As an alternate method, one can use scissors to cut the skin along the outer edges of the holder member 16. In this manner, the holder member 16 serves as a template for the fish skin 14 which is subsequently interposed and held by the holder member 16 on the base spoon member 12 as seen in FIGS. 1 and 2. A pair of slits can be cut in the fish skin 14 at appropriate places for allowing the screws 44 and 46 to pass through the fish skin 14 during the assembly of the holder member 16 onto the base spoon member 12.

FIGS. 4 and 5 show a modified form of the lure 10 which, in this case, is identified by the reference numeral 50. The modified lure 50 also comprises a base spoon member 52, a fish skin 54, and a holder member 56. As in the case of the base spoon member 12 of the lure 10, the base spoon member 52 takes the form of an oblong dished blade having a curved configuration in longitudinal and transverse cross section so as to present a convex surface 58 at its top side and a concave surface 60 at its bottom side. The base spoon member 52 differs from its corresponding part in the lure 10 by having an upwardly turned tongue 62 formed at one end and the other end formed with a U-shaped notch 64 adjacent to which is a round hole 66 located along the longitudinal center axis of the base spoon member 52.

The holder member 56 takes the form of an oblong tear-drop shaped member having a pair of round holes 68 and 70 at the opposite ends thereof for respectively receiving rings 72 and 74 for connection with a fish line 76 and a hook 78 as seen in FIG. 5. The holder member 56 is also formed with a large opening 80 which defines a pair of laterally spaced elongated bars 82 and 84 which interconnect the opposed ends of the holder member 56. In addition, a slot 86 is formed in the holder member 56 between the opening 80 and the hole 68. As in the case with the lure 10, the holder member 56 has a configuration that is complementary to that of the base spoon member 52 so that when the two are combined, as seen in FIGS. 4 and 5, the side edges of the holder member 56 and the base spoon member 56 are in vertical alignment with each other.

As seen in FIG. 6, the fish skin 54 has the configuration of the base spoon member 52 so it should be apparent the latter, in this case, served as the template in the manner described hereinbefore relative to the holder member 16. Once the fish skin is cut to fit the lure 50, the fish skin is placed on the convex surface 58 of the base spoon member 52, and the tongue 62 is inserted in the slot 86 formed in the holder member 56 resulting in one end of the fish skin being firmly grasped within the slot 86. Afterwards, the end of the base spoon member 52 having the notch 64 is rotated about the tongue 62 into full engagement with the lower concave surface of the holder member 56 at which time the hole 66 will register with the bore 88 of the holder member 56. The assembly is completed by passing a screw 90 through the hole 66 and rotating the knurled head of the screw 66 into threaded engagement with the tapped bore 88. In this manner, the fish skin 54 is secured between the holder member 56 and the base spoon member 52 with the notch 64 providing clearance for the ring 74 when the latter is located in the hole 70.

From the above description, it should be apparent that I have provided two forms of a new and improved fish lure that simulates a live fish by employing and incorporating therewith the scale side of a fish skin from a fish while simultaneously firmly retaining the peripheral edges of the fish skin so that water flows along the entire length of the exposed fish skin when the lure is pulled through the water thereby providing a visual and scented bait that will appeal to a fish. As should also be apparent, various changes and modifications can be made in the construction of my fish lure without departing from the spirit of my invention. Such changes and modifications are contemplated by me, and therefore I do not wish to be limited except by the scope of the appended claims.

The embodiments of the invention in which an exclusive property or privilege is claimed are defined as follows:

1. A lure for casting or trolling for fish and adapted to be connected to the line of an angler's tackle at one end and adapted to support a hook at the other end, a base member, a fish skin from a fish covering one surface of said base member, a holder member having an outer configuration in general conformity with the outer configuration of said base member and adapted to be moved relative to said base member, said holder member overlying said fish skin and having an opening formed therein of a length substantially equal to the length of said base member so as to expose a major portion of said fish skin, and fastening means for fixedly connecting said holder member to said base member so as to compress portions of said fish skin therebetween and maintain said fish skin on said base member while said lure is in the water.

2. The lure of claim 1 wherein the holder member serves as a template for cutting the fish skin.

3. The lure of claim 1 wherein the fastening means consists of at least one screw having a knurled head.

4. The lure of claim 1 wherein said holder member and base member each is oblong in configuration and in which one of said members is formed with a tongue insertable into a slot formed in the other member for interconnecting the members at corresponding ends thereof.

5. The lure of claim 1 wherein the fastening means connects the opposed ends of the base member and the holder member together and comprise a pair of screws.

6. The lure of claim 4 wherein a screw cooperates with said tongue and slot for fastening said holder member to said base member.

7. The lure of claim 1 wherein the holder member and the base member are tear-drop shaped in plan view and the holder member is formed with said opening being oblong which defines a pair of laterally spaced elongated bars which are adapted to engage the peripheral side portions of the fish skin to maintain the latter against the base member.

8. The lure of claim 1 wherein said base member and said holder member are made from a metallic material having a reflecting surface.

9. The lure of claim 1 wherein the opposed ends of the lure is formed with a pair of holes along the longitudinal center axis thereof for receiving ring members that connect respectively with the fish line and the hook.

10. The lure of claim 9 wherein said hook is a treble hook.

11. The lure of claim 4 wherein the base member is formed with the tongue and the holder member is formed with a pair of holes along the longitudinal center axis thereof for connection with the fish line and the hook.

12. The lure of claim 1 wherein the holder member takes the form of an elliptical ring member.

13. The lure of claim 3 wherein the screw is formed with knurled head so as to allow finger rotation thereof.

14. The lure of claim 3 wherein the outer surface of the holder member is of a color different from that of the base member.

15. The lure of claim 11 wherein the tongue cooperates with the slot for firmly holding one end of the fish skin.

16. A lure for casting or trolling for fish and adapted to be connected to the line of an angler's tackle at one end and adapted to support a hook at the other end, an oblong base member, a fish skin from a dead fish covering one surface of said base member, a holder member having an outer configuration in general conformity with the outer configuration of said base member and adapted to be moved relative to said base member, said holder member overlying said fish skin and having an oblong opening formed therein of a length and width substantially equal to the length and width of said base member so as to expose a major portion of said fish skin, and fastening means for fixedly connecting said holder member to said base member so as to compress portions of said fish skin therebetween and maintain said fish skin on said base member while said lure is in the water.

17. A lure for casting or trolling for fish and adapted to be connected to the line of an angler's tackle at one end and adapted to support a hook at the other end, a base spoon member having a convex surface, a fish skin from a recently live fish covering said convex surface of said base spoon member, a holder member having an outer configuration in general conformity with the outer configuration of said base spoon member and adapted to be moved relative to said base member, said holder member overlying said fish skin and having an opening formed therein of a length and width substantially equal to the length and width of said base spoon member so as to expose a major portion of said fish skin, and fastening means for fixedly connecting said holder member to said base spoon member so as to compress portions of said fish skin therebetween and maintain said fish skin on said base spoon member while said lure is in the water.

18. The lure of claim 17 wherein the holder member is formed with a concave surface conforming to the convex surface of the base member.

* * * * *